United States Patent [19]
Carter

[11] Patent Number: 5,035,444
[45] Date of Patent: Jul. 30, 1991

[54] SINGLE CUTTER SELF-PIERCING COVER ASSEMBLY FOR AIRBAG

[75] Inventor: James C. Carter, Dover, N.H.
[73] Assignee: Davidson Textron Inc., Dover, N.H.
[21] Appl. No.: 601,406
[22] Filed: Oct. 22, 1990
[51] Int. Cl.[5] .............................................. B60R 21/16
[52] U.S. Cl. .................................... 280/732; 280/728
[58] Field of Search ................ 280/732, 731, 728, 743

[56] References Cited

U.S. PATENT DOCUMENTS

| | | | |
|---|---|---|---|
| 3,622,176 | 11/1971 | Byer | 280/732 |
| 3,944,250 | 3/1976 | Wulf et al. | 280/732 |
| 4,097,064 | 4/1980 | Ikawa | 280/732 |
| 4,246,213 | 1/1981 | Takamatsu et al. | 264/46.7 |

FOREIGN PATENT DOCUMENTS

2643451  4/1977  Fed. Rep. of Germany ...... 280/732

Primary Examiner—Charles A. Marmor
Assistant Examiner—Tamara L. Finlay
Attorney, Agent, or Firm—John C. Evans

[57] ABSTRACT

A cover assembly for an air cushion restraint has a smooth cover with a layer of foam between the cover and a load bearing insert for covering a housing for an airbag and a gas generator which generates an inflatant for the airbag for deploying the airbag; the cover assembly includes a single cutter which has three blade edges of a depth to cut through the layer of foam and smooth cover before a cover insert member is actuated to form a three sided opening through the cover assembly through which the airbag is deployed; the single cutter is pivoted on a retainer insert member as the airbag is inflated to cause cutting edges on the cutter to pierce the smooth outer cover member. The cutter is recessed within the cover assembly to avoid incidental contact with the cutting edges prior to deployment. The cutter is bent to be self-retained following airbag deployment to shield the cutting edges from passenger contact during secondary impacts.

19 Claims, 3 Drawing Sheets

SINGLE CUTTER SELF-PIERCING COVER ASSEMBLY FOR AIRBAG

FIELD OF THE INVENTION

This invention relates to airbag restraint systems for vehicles and more particularly to such airbag restraint systems which are covered by a cover assembly for concealing the airbag restraint system in a vehicle passenger compartment.

BACKGROUND OF THE INVENTION

Various airbag restraint systems are known in which a cover assembly covers the airbag restraint components prior to deployment of an airbag into the vehicle passenger compartment.

U.S. Pat. No. 3,622,176 discloses a cover with a perforated outer skin. The problem with such an arrangement is that the weakened sections are visible and thus do not fully conceal the underlying airbag restraint system. Furthermore, such systems depend upon the force of the inflating airbag to tear the cover to form a deployment opening therein. Such tearing can at times hinder deployment in an undesirable manner.

U.S. Pat. No. 4,097,064 discloses a cover assembly which carries a cutter to pierce the outer skin of the cover assembly. However, the '064 arrangement requires a separate inertially responsive shield for protecting the airbag during its deployment.

U.S. Pat. No. 4,246,213 discloses a cover assembly that includes a cover having weakened sections in the outer shell or skin of a cover assembly. The '213 arrangement depends upon tearing of the outer skin at the weakened sections for airbag deployment and presents the same disadvantages as in the case of the '176 patent.

SUMMARY OF THE INVENTION

The present invention includes an airbag restraint system in which a single cutter is actuated to cleanly cut the outer skin portion of a cover assembly for the airbag restraint system so as to prevent the outer skin from tearing and creating debris in the passenger car of a vehicle when the airbag is deployed to protect a passenger when the vehicle is impacted.

A feature of the present invention is to provide a self-piercing cover assembly for an airbag restraint system in which a single cutter is located in a recessed disposition prior to deployment and the single cutter is pivotally mounted on a retainer insert by a weakened arm section which bends on airbag deployment so as to be self retained in a raised windshield engaged position following airbag deployment.

A further feature of the present invention is to provide a self-piercing cover assembly for an airbag restraint system which will form a three sided opening through the cover assembly solely in response inflation of the airbag and impact of the airbag against the inboard surface of the cover assembly wherein the opening is formed by three sharp cutting edges on a single cutter having a recessed position below the cover during normal operation to prevent contact therewith in non-deployment incidents; a cover piercing position in which the cutting edges cut through the cover before a cover insert member is opened and a pivot support for the cutter being bent to cause the cutter to be self retained in a position against the windshield of a vehicle following airbag deployment.

Yet another feature of the present invention is to provide self-piercing cover assemblies as set-forth in the preceding summary further characterized by having a single cutter located on three sides of a cover insert member located in an access hole through the retainer insert of an interior trim assembly and wherein a pivot connection is provided between the cutter and the retainer insert to hold it in a recessed position with the cover assembly; the pivot connection is arranged to control pivotal movement of the cutter on airbag deployment to pierce the outer cover and wherein the cutter is bent to form a self retained protected position against the windshield of a vehicle.

Still another feature of the present invention is to provide an interior trim product for a vehicle having a cover assembly for concealing an airbag restraint system within the interior trim product and wherein the cover assembly includes a polymeric outer skin; a foam layer and an retainer insert member for supporting the interior trim product on the frame of a vehicle; the retainer insert member being provided with an opening having a hinged cover insert member supported therein; the retainer insert member pivotally carries a single cutter operative solely in response to inflation of the airbag to pierce the outer skin and foam layer around the cover insert member laterally outboard of three sides thereof so as to cause the cutting edge of the cutter to pierce the foam and polymeric outer skin to form a clean cut, debris free, three sided opening therein prior to displacement of the cover insert member to prevent tearing of the polymeric outer skin and foam layer and thereby to prevent production of resultant debris while producing an escape passage for deployment of the airbag into the passenger compartment of a vehicle; the cutter is pivoted at a point such that the upper surface of the pivot arm will engage the retainer insert and bend as the three sided opening is formed whereby the cutter is self retained in its fully open position so as to shield the cutting edges from the passenger compartment.

Yet another object of the invention is to provide a cover assembly for concealing an airbag restraint system including an airbag, a housing for the airbag, a gas generator located in the housing for supplying gas to the air bag in response to vehicle impact; the cover assembly having an outer cover on the cover assembly fully concealing the air restraint system when the airbag is deflated; a single cutter is located inboard of the outer cover; the cutting having three cutting edges located in spaced recessed relationship to the inboard surface of the outer cover and laterally spaced outboard of the edges of a hinged cover insert member in the cover assembly; the cutter is operative in response to deployment of the airbag to cleanly cut the outer cover to form an opening therein for deployment of the cover insert member and the airbag through the cover assembly to a point outwardly thereof for protecting a vehicle occupant in a vehicle passenger compartment.

These and other objects, advantages and features of the present invention will be more apparent when taken in conjunction with the following detailed description of the invention along with reference to the accompanying drawings wherein:

DETAILED DESCRIPTION OF THE INVENTION

Figure 1:
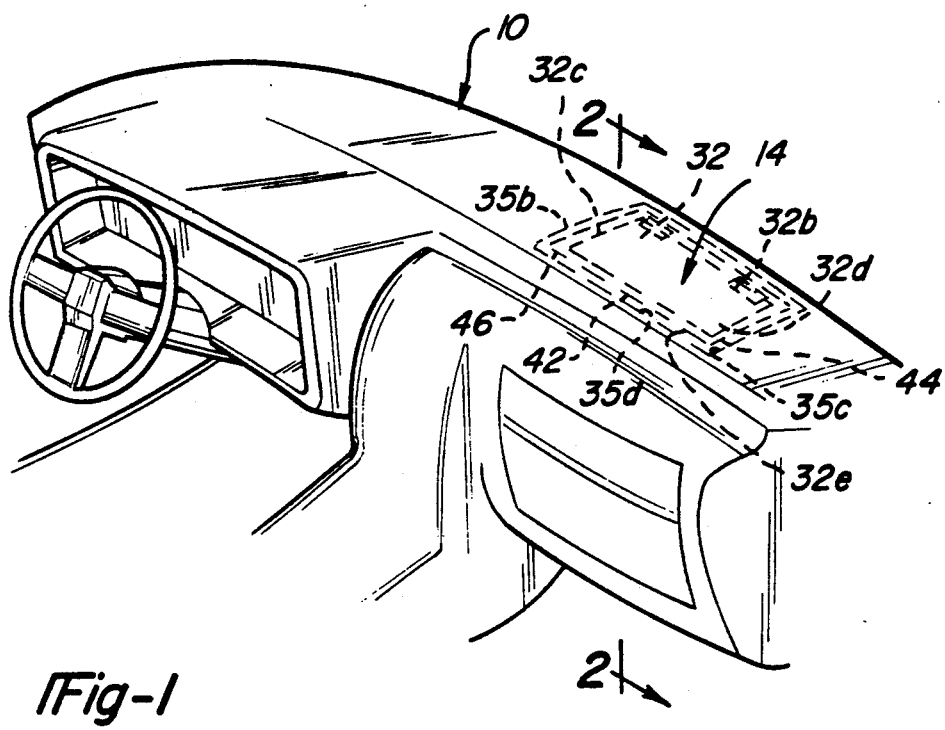
FIG. 1 is a perspective view of an instrument panel assembly including the cover assembly of the present invention.
Figure 2:
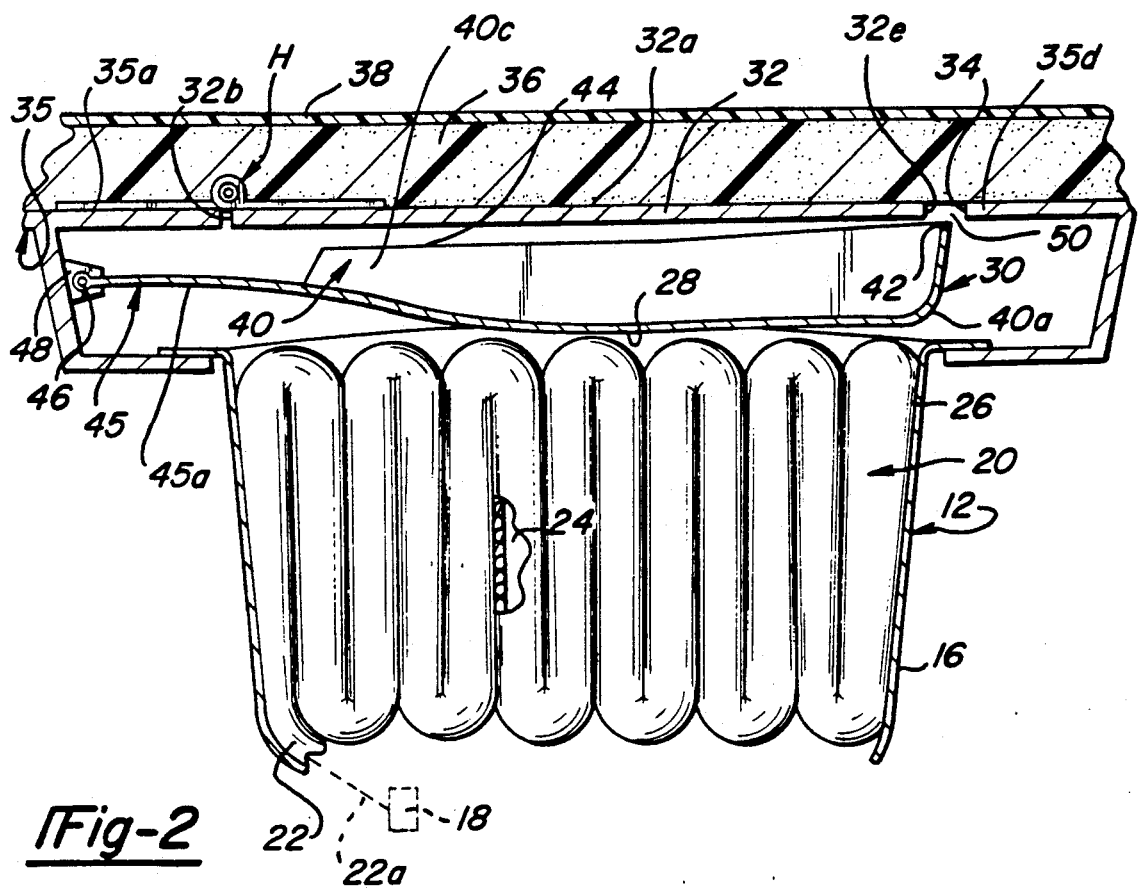
FIG. 2 is a fragmentary sectional view taken along the line 2—2 of FIG. 1 looking in the direction of the arrows.
Figure 3:
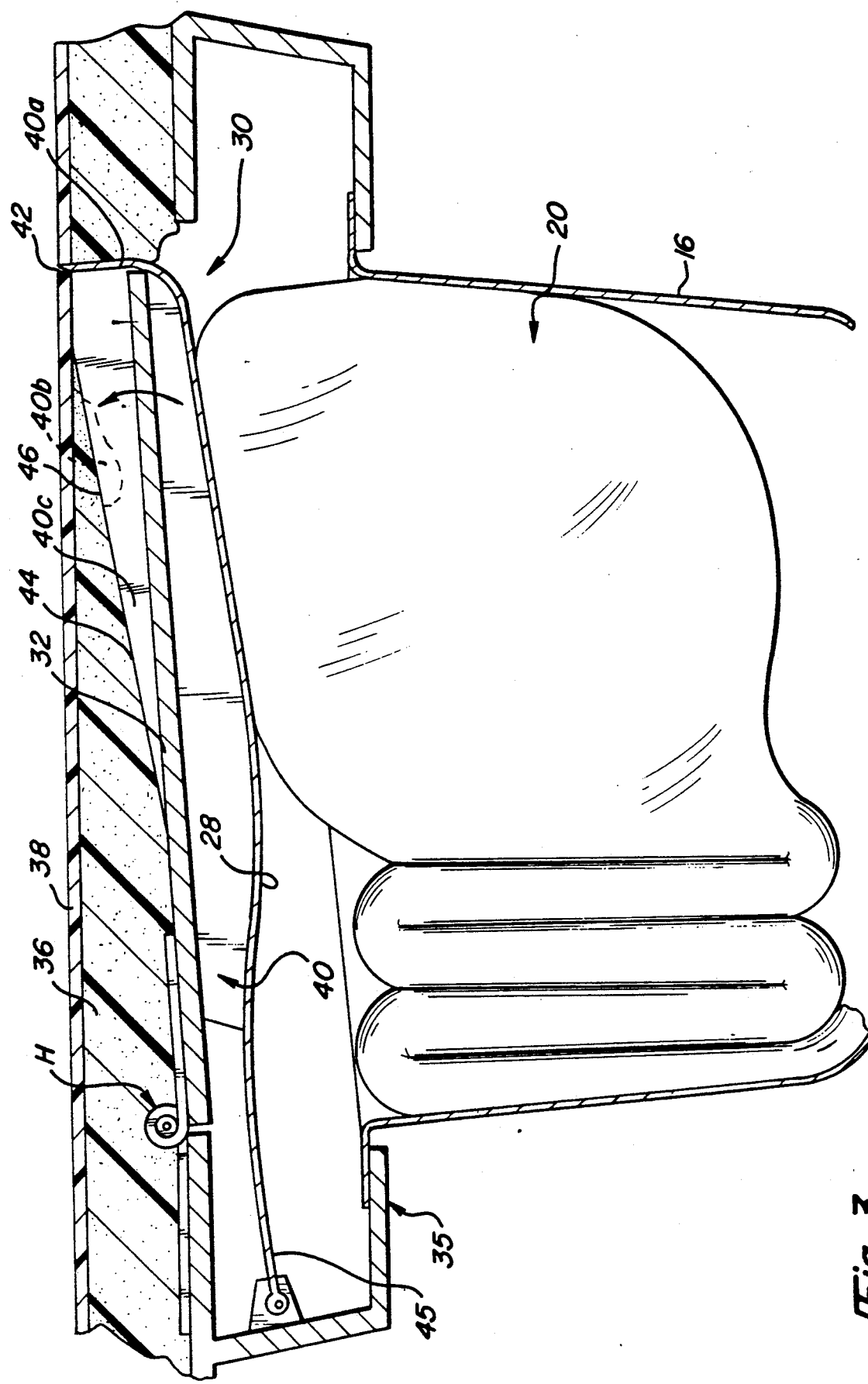
FIG. 3 is a fragmentary enlarged sectional view of the present invention showing the cutter in its cover cutting position prior to deployment of a hinged cover insert member.

FIG. 1 shows a instrument panel 10 having a airbag restraint system 12 located behind a cover assembly 14 constructed in accordance with the present invention.

The airbag restraint system 12 includes an airbag housing 16 which encloses a gas generator 18 for supplying an inflatant to an airbag 20 shown in a collapsed position within the housing 16. The airbag 20 includes an inboard end 22 defining a passage 22a for flow of the inflatant from the gas generator 18 into the interior 24 of the airbag 22. The airbag 20 also includes an outboard end 26 which is engageable with the inboard surface 28 of a cutter unit 30.

The cutter unit 30 includes a cover insert member 32. The cover insert member 32 has a shape corresponding to the shape of an opening 34 formed in a retainer insert member 35 which is secured by suitable fasteners in a known manner to the vehicle frame so as to fix the instrument panel 10 in place within the passenger compartment of the vehicle. The cover insert member 32 has an outboard surface 32a bonded to a layer of urethane foam 36 formed in underlying relationship to a polymeric skin or shell 38 forming the outer surface of the instrument panel 10. The skin or shell 38 has no breaklines, tearlines or weakened sections which are apparent from the exterior of the cutter unit 30 such that the cover assembly 14 in effect constitutes an invisible piercing assembly as will be further described below.

The cover insert member 32 is shown in hidden line in FIG. 1 as having a rectangular shape. In accordance with one aspect of the invention the edge 32b of the cover insert member which is located parallel to the windshield W of the vehicle is connected to an upper surface 35a of the retainer insert member 35 by a hinge H.

In accordance with one aspect of the present invention, a single cutter 40 is recessed within the instrument panel 10 below the outer skin or shell 38 thereof by a distance such that incidental contact with the outer surface of the instrument panel will not expose the cutting edge of the cutter 40 in an undesirable manner. The cutter 40 more particularly has three sides 40a–40c sharp cutting edges 42, 44, and 46 thereon.

Each of the cutting edges 42–46 are further shielded in their normal recessed position by side portions 35b–35d of the retainer insert 35 and side edges 32c–32e of the cover insert member 32.

Figure 4:
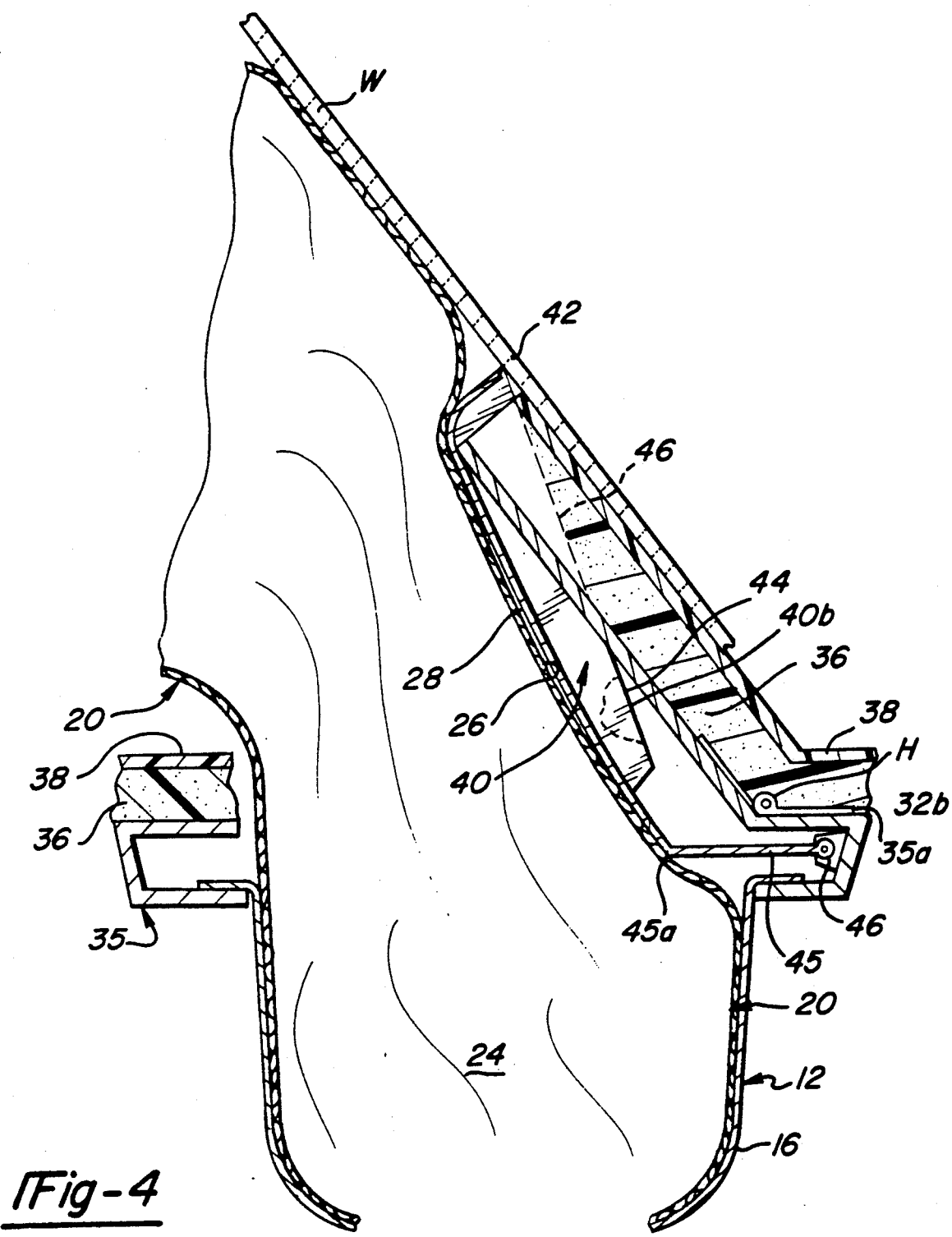
FIG. 4 is a view of the cover assembly of the present invention following deployment of the airbag.

The cutter 40 has a pivot arm 45 which is pivotally connected by a pin 46 to a support tab 48 on the retainer insert 35. The sharp cutting edges 42–46 are aligned with an opening 50 formed around three sides of the cover insert member 32. The cutter 40 is bent slightly to locate the bottom inboard surface 28 of the cutter assembly 30. The inboard surface 28 is engaged by the airbag 20 as it is deployed. The height of each of the three sides 40a–40c is selected so that the sharp cutting edges 42–46 thereon will pierce both the foam layer 36 and the outer shell 38 before the inside surface 52 of the cutter 40 will move the cover insert member by pivoting it upwardly about the hinge H. As a consequence, as shown in FIG. 4, a clean cut three sided piercing of the cover assembly 14 will occur before the cover insert member 32 opens. Such a clean-cut three sided opening will prevent debris producing tearing of either the foam layer 36 or the outer shell 38.

In operation, when the airbag 20 inflates in response to an impact sensed by an inertial sensor (not shown) which triggers generation of inflatant from the generator 18, the cutter or blade 40 is engaged by the airbag 20 and swung upwardly. The sharp edges 42-46 initially cut through the foam layer 36 and then continue to cut upwardly through the outer skin or shell 38 to form a three sided opening through which the airbag 20 is deployed into the passenger compartment. The sharp edges 42-46 completely cut the outer shell 38 before the airbag opens the cover insert member 32 by forcing it through the resultant door opening formed by the three cut sides in the shell member 38 around and above the cover insert member 32.

While the cover assembly 14 is shown as having a urethane foam layer 36 with an outer shell 38 it should be understood that the outer skin 38 can be formed as a more dense outer surface on the foam layer 36. Furthermore, while an instrument panel 10 is illustrated with a retainer member, the invention is equally suitable for use with other interior trim products such as consoles and steering wheel covers. Further, the cover compositions and arrangements can have a different polymer composition than urethane foam. Further, the retainer member may be omitted and the cutter unit can be supported by other structure for piercing the cover assembly 14 solely in response to inflation of an airbag in an airbag restraint system.

A feature of the present invention is that the cutter 40 is configured such that the cutting edges 42-46 thereof will follow the insert cover member 32 as it pivots against the windshield W. The cutter 40 has a weakened section 45a at the pivot arm 45 which will bend at full airbag deployment as shown in FIG. 4. The bent pivot arm 45 will remain against the windshield W and the sharp cutting edges 42-46 will be shielded from the passenger compartment between the surface 28 and the windshield W to prevent passenger contact therewith during secondary impacts.

The secondary impact protection feature is attributable to the manner in which the cover insert member 32 is separated from the cover assembly 14. As shown in FIG. 4, the cover assembly 14 will be cut such that the cover insert member 32 will be separated on three edges from the foam layer 36 and the outer skin or shell 38. The cutter 40 and the cover insert member 32 are lifted outwardly of the instrument panel in the direction of the vehicle windshield W along with the cover insert member 32. The airbag when fully deployed will bend the pivot arm 45 to lock the cutter 40 in its raised position against the windshield W.

Once the airbag is deployed as shown in solid lines in FIG. 4, it will collapse as shown in hidden lines in FIG. 4. At this point the cutter 40 remains in its bent position as shown in FIG. 4 so as to be protected against passenger contact in the event of secondary impacts.

Examples of suitable foam materials include low modulus material, such as reaction injection molded urethane material having a flexural modulus in the range of 20-80,000 psi at 75 degrees F. or comparable urea or microcellular urethane foam material.

Examples of suitable shell materials include polyvinyl chloride or other thermoplastic materials such as thermoplastic or thermoplastic olefins.

While exemplary materials for the cover assembly are disclosed herewith it should be understood that the invention is applicable for use with a wide range of other materials including fabrics (both natural and synthetic) leather and other backing materials than the illustrated foam layers (which in certain cover assemblies can be omitted in the entirety).

The foregoing is a complete description of a preferred embodiment of the present invention. It should be understood, however, that various changes and modifications may be made without departing from the spirit and scope of the present invention as set forth in the following claims.

What is claimed is:

1. A cover assembly for concealing an airbag restraint system including an airbag, a housing for the airbag, a gas generator located in the housing for supplying gas to the air bag in response to vehicle impact the cover assembly comprising:
   an outer shell, a backing layer of foam on said shell and a retainer insert member for securing the cover assembly on a support;
   a cover insert member inboard of said foam layer having four side edges thereon forming an opening with respect to said retainer insert member;
   a single cutter means pivotally connected to said retainer insert member at a recessed position inboard of said outer shell; said single cutter means including a plurality of sharp cutting edges located adjacent three of said four side edges prior to deployment of said airbag;
   actuator means responsive to deployment of said airbag to cause said single cutter means to pivot with respect to said retainer insert member to cause said sharp cutting edges to sequentially cut through said foam layer and said outer shell at said opening between said insert cover member and said retainer insert member for forming a three sided opening in said outer shell before said cover insert member is displaced and said cover insert member thereafter being engaged by said airbag during its deployment to open so as to define a passage for deployment of said airbag into a vehicle passenger compartment.

2. The cover assembly of claim 1 further characterized by said single cutter means having an inboard pivot arm located inboard of said cover insert member and having a surface thereon engageable with said airbag for bending said single cutter means to a self retained position wherein said cutter edges are protected from contact during secondary vehicle impacts.

3. The cover assembly of claim 2 further characterized by said single cutter means with a pivot arm which bends as said cutter means cuts said cover assembly when said airbag is fully deployed.

4. The cover assembly of claim 1 further characterized by said three sharp cutting edges positioned at a point located below said opening prior to airbag deployment;
   said actuator means pivoting said single cutter means in a direction to cause said sharp cutting edges thereof to form a three sided opening in said outer shell and to form a pivot connection between said insert cover member and said outer shell for swinging said insert cover member upwardly in the direction of a front windshield of a vehicle; and
   said actuator means including means to bend said single cutter means to a self retained position against a windshield following deployment of said airbag.

5. The cover assembly of claim 4 further characterized by having a cutter pivot arm with a weakened section which locates said cover insert member in a recessed position with respect to said outer shell prior to deployment of said airbag.

6. The cover assembly of claim 4 further characterized by said cover insert member including hinge means pivotally connected to said insert cover member and said retainer insert when said airbag is fully deployed.

7. The cover assembly of claim 1 further characterized by said single cutter means including a blade pivotally connected to said retainer insert member at a first surface thereon; an actuator surface on said airbag engaging said blade to pivot said blade in a direction to cause said sharp cutting edge thereof to cut said outer skin before said cover insert member is moved by said airbag during its deployment.

8. The cover assembly of claim 7 further characterized by a blade support arm pivotally connected to said retainer insert member at a second surface thereon; said blade engageable with said actuator means to permit movement of said blade to cut said outer shell prior to opening movement of said cover insert member during deployment of said airbag.

9. The cover assembly of claim 8 further characterized by said blade support arm having a weakened section for supporting said blade for movement with respect to said cover insert member for separation of said foam layer and outer shell before said cover insert member opens and said blade support arm being raised by airbag deployment and bending following opening of said cover insert member to allow for self retention of said blade in a raised position shielded against the vehicle interior.

10. An interior trim member having an invisible door for concealing an airbag restraint system including an airbag, an airbag housing, a gas generator and a retaining member for supporting the interior trim member on a vehicle frame characterized by:
    the interior trim member having an outer skin with a smooth outer surface, a foam backing layer and an retainer insert member bonded together as a composite assembly;
    a cover insert member located inboard of said foam layer having side edges thereon forming an opening with respect to said retainer insert member;
    a single cutter means pivotally connected to said retainer insert member at a point recessed below said outer shell; said single cutter means each including a sharp cutting edge located adjacent one of said side edges prior to deployment of said airbag;
    means responsive to deployment of said airbag to cause said single cutter means to pivot with respect to said retainer insert member to cause said sharp cutting edges to sequentially cut through said foam layer and said outer shell at said opening between said cover insert member and said retainer insert member for forming a three sided opening in said outer shell defining a passage for deployment of said airbag into a vehicle passenger compartment.

11. The cover assembly of claim 10 further characterized by having a cover insert member support system including hinge means for retaining said cover insert member with respect to said outer shell prior to deployment of said airbag.

12. The cover assembly of claim 10 further characterized by said actuator means including hinge means on said cover insert member and connecting said cover insert member to said retainer insert when said airbag is fully deployed.

13. The cover assembly of claim 10 further characterized by said single cutter means including a blade having a blade support arm pivotally connected to said retainer insert member at a first surface thereon; an actuator engaging said blade to pivot said blade in a direction to cause said sharp cutting edge thereof to cut said outer skin before said cover insert member is moved by said airbag during its deployment.

14. The cover assembly of claim 13 further characterized by a cover insert member hinge pivotally connected to said retainer insert member at a second surface thereon; said blade having edges of a height to permit movement of said blade to cut said outer shell prior to opening movement of said cover insert member during deployment of said airbag.

15. The cover assembly of claim 13 further characterized by said blade support arm having a weakened section for supporting said blade for movement with respect to said cover insert member for separation of said foam layer and outer shell before said cover insert member opens and said blade support arm being raised by airbag deployment and bending following opening of said cover insert member to allow for self retention of said blade in a raised position shielded against the vehicle interior.

16. A cover assembly for concealing an airbag restraint system including an airbag, a housing for the airbag, a gas generator located in the housing for supplying gas to the air bag in response to vehicle impact the cover assembly comprising:

an outer shell, a retainer insert member for securing the cover assembly on a support;

a cover insert member having four side edges thereon forming an opening with respect to said retainer insert member;

a single cutter means pivotally connected to said retainer insert member at a recessed position inboard of said outer shell; said single cutter means including a plurality of sharp cutting edges located adjacent three of said four side edges prior to deployment of said airbag;

actuator means responsive to deployment of said airbag to cause said single cutter means to pivot with respect to said retainer insert member to cause said sharp cutting edges to cut through said outer shell at said opening between said insert cover member and said retainer insert member for forming a three sided opening in said outer shell before said cover insert member is displaced and said cover insert member thereafter being engaged by said airbag during its deployment to open so as to define a passage for deployment of said airbag into a vehicle passenger compartment.

17. The cover assembly of claim 16, further characterized by said single cutter means having an inboard pivot arm located inboard of said cover insert member and having a surface thereon engageable with said airbag for bending said single cutter means to a self retained position wherein said cutter edges are protected from contact during secondary vehicle impacts.

18. The cover assembly of claim 16, further characterized by said single cutter means with a pivot arm which bends as said cutter means cuts said cover assembly when said airbag is fully deployed.

19. The cover assembly of claim 16, further characterized by said three sharp cutting edges positioned at a point located below said opening prior to airbag deployment;

said actuator means pivoting said single cutter means in a direction to cause said sharp cutting edges thereof to form a three sided opening in said outer shell and to form a pivot connection between said insert cover member and said outer shell for swinging said insert cover member upwardly in the direction of a front windshield of a vehicle; and said actuator means including means to bend said single cutter means to a self retained position against a windshield following deployment of said airbag.

* * * * *